United States Patent
Shao

(10) Patent No.: US 11,777,787 B2
(45) Date of Patent: Oct. 3, 2023

(54) VIDEO-BASED MAINTENANCE METHOD, MAINTENANCE TERMINAL, SERVER, SYSTEM AND STORAGE MEDIUM

(71) Applicant: BEIJING JINGDONG ZHENSHI INFORMATION TECHNOLOGY CO., LTD., Beijing (CN)

(72) Inventor: Yanju Shao, Beijing (CN)

(73) Assignee: Beijing Jingdong Zhenshi Information Technology Co., Ltd., Beijing (CN)

( * ) Notice: Subject to any disclaimer, the term of this patent is extended or adjusted under 35 U.S.C. 154(b) by 0 days.

(21) Appl. No.: 17/758,248

(22) PCT Filed: Dec. 16, 2020

(86) PCT No.: PCT/CN2020/136947
§ 371 (c)(1),
(2) Date: Jun. 30, 2022

(87) PCT Pub. No.: WO2021/135951
PCT Pub. Date: Jul. 8, 2021

(65) Prior Publication Data
US 2023/0027133 A1 Jan. 26, 2023

(30) Foreign Application Priority Data
Jan. 2, 2020 (CN) .......................... 202010003243.6

(51) Int. Cl.
*H04L 41/0631* (2022.01)
*H04L 41/0677* (2022.01)
*H04L 41/50* (2022.01)

(52) U.S. Cl.
CPC ...... *H04L 41/0631* (2013.01); *H04L 41/0677* (2013.01); *H04L 41/509* (2013.01)

(58) Field of Classification Search
CPC .................. H04L 41/0631; H04L 41/0677; H04L 41/509
See application file for complete search history.

(56) References Cited

U.S. PATENT DOCUMENTS

| 8,214,290 B1* | 7/2012 | Vannatter | G07F 19/209 370/254 |
| 2013/0218783 A1* | 8/2013 | Anand | G06Q 10/20 705/304 |
| 2014/0378781 A1* | 12/2014 | Peluso | A61B 5/01 600/301 |

FOREIGN PATENT DOCUMENTS

| CN | 102801960 A | 11/2012 |
| CN | 105553978 A | 5/2016 |

(Continued)

OTHER PUBLICATIONS

Jones et al., "Forming Emergent Configurations in Smart Office IoT Systems", May 2017.*

(Continued)

*Primary Examiner* — Todd L Barker
(74) *Attorney, Agent, or Firm* — Qinghong Xu

(57) ABSTRACT

A video based maintenance method, a maintenance terminal, a server, a system, and a storage medium. The method includes: receiving, by a maintenance terminal, a maintenance order sent by a server, wherein the maintenance order is generated according to a maintenance request sent by a client, and the maintenance order comprises customer information, faulty product information and fault information; and wherein the fault information comprises one or more troubleshooting points; receiving, by the maintenance terminal, a video stream sent by the client; and recording, by the maintenance terminal, troubleshooting information of the troubleshooting points, and sending the troubleshooting information to the server.

12 Claims, 6 Drawing Sheets

(56) References Cited

FOREIGN PATENT DOCUMENTS

| | | | |
|---|---|---|---|
| CN | 106230628 | A | 12/2016 |
| CN | 107222569 | A | 9/2017 |
| CN | 107342878 | A | 11/2017 |
| CN | 108667649 | A | 10/2018 |
| CN | 110062007 | A | 7/2019 |
| CN | 111182291 | A | 5/2020 |
| JP | 2001017715 | A | 1/2001 |
| JP | 2002149866 | A | 5/2002 |
| JP | 2007149070 | A | 6/2007 |
| JP | 2012150686 | A | 8/2012 |
| JP | 2013149252 | A | 8/2013 |
| JP | 5914697 | B2 | 5/2016 |
| JP | 2016173691 | A | 9/2016 |
| JP | 2017144532 | A | 8/2017 |
| JP | 2018121332 | A | 8/2018 |
| WO | 2014102918 | A1 | 7/2014 |

OTHER PUBLICATIONS

Shen et al., "Development of remote interaction system in drilling field", 2017 3rd IEEE International Conference on Computer and Communications, Dec. 13, 2017, IEEE Publishing.*

International Search Report dated Mar. 16, 2021 of PCT International Application No. PCT/CN2020/136947.

The First Office Action dated Aug. 27, 2020 of Chinese Patent No. 202010003243.6.

Notice of Allowance dated Feb. 3, 2021 of Chinese Patent No. 202010003243.6.

Notice of Reasons for Refusal dated Jul. 4, 2023 of Japanese Application No. 2022-525864.

* cited by examiner

VIDEO-BASED MAINTENANCE METHOD, MAINTENANCE TERMINAL, SERVER, SYSTEM AND STORAGE MEDIUM

CROSS REFERENCE

The present disclosure is a U.S. national phase application of International Application No. PCT/CN2020/136947 filed on Dec. 16, 2020, which claims priority of Chinese Patent Application No. 202010003243.6, filed on Jan. 2, 2020 and entitled "VIDEO-BASED MAINTENANCE METHOD, MAINTENANCE TERMINAL, SERVER, SYSTEM AND STORAGE MEDIUM", which is incorporated herein by reference in its entity.

TECHNICAL FIELD

The present disclosure relates to the technical field of information networks, and in particular, to a video-based maintenance method, a maintenance terminal, a server, a system and a storage medium.

BACKGROUND

In nowadays consumer market, for most commodities, manufacturers, sellers or sales platforms need to provide end consumers with reliable after-sales services, especially after-sales maintenance services. When a product goes wrong and needs to be repaired, the customer usually makes an appointment for on-site maintenance directly. However, such direct on-site maintenance requires an appointment to match the time between a repair man and the customer, which is slow in time and high in cost. At the same time, it is also found that the following problems often occur in the direct on-site maintenance in practice. After one on-site maintenance, the repair man finds that special accessories are needed and the product cannot be repaired on site, thus it is necessary to visit the customer once again, or even multiple times, which prolongs the repair time. Either the repair man finds after an on-site examination that the fault is very simple, and the customer can choose to solve it by himself, without waiting for the on-site maintenance, which wastes time and increases cost.

In the context of the massive development of e-commerce, the number of products sold by manufacturers, sellers or sales platforms has greatly increased, accordingly the amount of after-sales services required for products has also increased dramatically. How to assist in a timely and efficient manner to deal with after-sales maintenance for products by technical means is an urgent need to be addressed.

It should be noted that the information disclosed in above section is only for enhancement of understanding of the background of the present disclosure, and thus may include information that does not form the prior art already known to those of ordinary skill in the art.

SUMMARY

The purpose of the present disclosure is to provide a video-based maintenance method, a maintenance terminal, a server, a system and a storage medium, so as to achieve, at least to a certain extent, effective assistance in the off-site maintenance, and to assist the repair man to complete preliminary fault diagnosis before the repair man' visiting service.

Other features and advantages of the present disclosure will become apparent from the following detailed descriptions, or be learned in part by practice of the present disclosure.

According to a first aspect of the present disclosure, a video-based maintenance method is provided, a maintenance terminal is communicatively connected to a server and a client, and the method includes: receiving, by the maintenance terminal, a maintenance order sent by the server, wherein the maintenance order is generated according to a maintenance request sent by the client, and the maintenance order includes customer information, faulty product information and fault information; and wherein the fault information includes one or more troubleshooting points; receiving, by the maintenance terminal, a video stream sent by the client; and recording, by the maintenance terminal, troubleshooting information of the troubleshooting points, and sending the troubleshooting information to the server.

In some embodiments, recording, by the maintenance terminal, troubleshooting information of the troubleshooting points, and sending the troubleshooting information to the server includes: recording, by the maintenance terminal, troubleshooting information of part of the troubleshooting points, and sending the troubleshooting information to the server; receiving, by the maintenance terminal, updated fault information, where the updated fault information includes one or more updated troubleshooting points, and the updated fault information is generated and updated by the server according to the troubleshooting information; and recording, by the maintenance terminal, troubleshooting information of the updated troubleshooting points, and sending the troubleshooting information to the server.

In some embodiments, recording, by the maintenance terminal, troubleshooting information of the troubleshooting points, and sending the troubleshooting information to the server includes: extracting, by the maintenance terminal, from the video stream a video clip or an image of a component corresponding to the troubleshooting points, and sending the video clip or the image to the server as the troubleshooting information of the troubleshooting points.

In some embodiments, recording, by the maintenance terminal, troubleshooting information of the troubleshooting points, and sending the troubleshooting information to the server includes: receiving and displaying, by the maintenance terminal, fault determination information generated by the server according to the video clip or the image of a component.

According to another aspect of the present disclosure, a video-based maintenance method is provided, which includes: receiving, by a server, a maintenance request sent by a client, and generating a maintenance order according to the maintenance request, wherein the maintenance request includes fault description information, and the maintenance order includes customer information, faulty product information and fault information; and wherein the fault information includes one or more troubleshooting points; sending, by the server, the maintenance order to a maintenance terminal; receiving, by the server, troubleshooting information sent by the maintenance terminal, wherein the troubleshooting information is recorded by the maintenance terminal in response to receiving a video stream sent by the client; and generating, by the server, a maintenance report according to the troubleshooting information, and sending the maintenance report to the client.

In some embodiments, receiving, by a server, a maintenance request sent by a client, and generating a maintenance order according to the maintenance request, wherein the maintenance request includes fault description information includes: receiving, by the server, the maintenance request sent by the client; retrieving, by the server, a transaction record according to the maintenance request, and extracting the faulty product information from the transaction record; and generating, by the server, the troubleshooting points according to the fault description information and the faulty product information.

In some embodiments, the method further includes utilizing, by the server, a historical maintenance record in advance to perform operations, to generate all of the one or more troubleshooting points corresponding to the faulty product information and the fault description information.

According to another aspect of the present disclosure, a maintenance terminal for video-based maintenance is provided, the maintenance terminal is communicatively connected to a server and a client, and the maintenance terminal includes: a maintenance order processing unit configured to receive a maintenance order sent by the server, and display customer information, faulty product information and fault information according to the maintenance order, wherein the fault information includes one or more troubleshooting points; a video communication unit configured to receive a video stream sent by the client; and a troubleshooting unit configured to receive and store troubleshooting information of the troubleshooting points, and send the troubleshooting information to the server.

According to a further aspect of the present disclosure, a server for video-based maintenance is provided, which includes: a maintenance order generation unit configured to receive a maintenance request sent by a client, and generate a maintenance order according to the maintenance request, wherein the maintenance request includes fault description information, and the maintenance order includes customer information, faulty product information and fault information; and wherein the fault information includes one or more troubleshooting points; a maintenance allocation unit configured to send the maintenance order to a maintenance terminal; a maintenance recording unit configured to receive troubleshooting information of the troubleshooting points sent by the maintenance terminal, wherein the troubleshooting information is recorded by the maintenance terminal in response to receiving a video stream sent by the client; and a maintenance report generation unit configured to generate a maintenance report according to the troubleshooting information, and send the maintenance report to the client.

According to a further aspect of the present disclosure, a video interactive maintenance system is provided, which includes a server and a plurality of maintenance terminals; wherein the server is configured to receive a maintenance request sent by a client, and generate a maintenance order according to the maintenance request, wherein the maintenance request includes fault description information, and the maintenance order includes customer information, faulty product information and fault information; and wherein the fault information includes one or more troubleshooting points; the server is configured to send the maintenance order to a maintenance terminal of the plurality of maintenance terminals; the maintenance terminal is configured to receive a video stream sent by the client; the maintenance terminal is configured to record troubleshooting information of the troubleshooting points, and send the troubleshooting information to the server; and the server is configured to generate a maintenance report according to the troubleshooting information, and send the maintenance report to the client.

According to yet another aspect of the present disclosure, there is provided a computer-readable storage medium having a computer program stored thereon, which when executed by a processor, cause the video-based maintenance method according to the first aspect of the present disclosure to be implemented.

According to the video-based maintenance method, system, and storage medium provided by the embodiments of the present disclosure, a client and a server communicate with a maintenance terminal, so that troubleshooting information of troubleshooting points can be recorded by the maintenance terminal before the on-site maintenance, by means of receiving a video stream sent by the client, thereby effectively assisting the repair man to carry out prepositive off-site maintenance. In this way, the customer can choose whether the on-site maintenance services are needed according to a maintenance report.

One or more troubleshooting points are generated by the server, which can effectively assist the repair man to make fault determination, avoid missing causes of the fault, and improve the accuracy of the fault determination.

The maintenance terminal for video-based maintenance provided by the embodiments of the present disclosure receives the video stream sent by the client through a video communication unit, and cooperates with a maintenance order processing unit, which displays the one or more troubleshooting points, so as to effectively assist the repair man to carry out prepositive off-site maintenance, avoid missing causes of the fault, and improve the accuracy of the fault determination. A troubleshooting unit receives and stores the troubleshooting information of the troubleshooting points, and sends the troubleshooting information to the server, so that the server can generate a maintenance report in subsequent operations, and send the maintenance report to the client, so as to realize the off-site maintenance, and to help the customer to decide, according to the maintenance report, whether the on-site maintenance is needed.

The server for video-based maintenance provided by the embodiments of the present disclosure generates a maintenance order including one or more troubleshooting points through a maintenance order generation unit, and sends the maintenance order to the maintenance terminal through a maintenance allocation unit, thereby realizing the effective allocation of the maintenance terminals and assisting the repair man in completing the prepositive off-site maintenance in subsequent operations, to avoid missing causes of the fault and improve the accuracy of the fault determination. The server receives the troubleshooting information which is recorded by the maintenance terminal in response to receiving the video stream sent by the client through a maintenance recording unit, and generates the maintenance report through a maintenance report generation unit and sends it to the client, thereby realizing off-site maintenance assistance.

It should be understood that the foregoing general descriptions and the following detailed descriptions are exemplary and explanatory only and are not restrictive of the present disclosure.

BRIEF DESCRIPTION OF THE DRAWINGS

The drawings, which are incorporated in and constitute a part of the specification, illustrate embodiments consistent with the disclosure and serve together with the specification to explain the principles of the present disclosure. Obviously, the drawings in the following descriptions are only some embodiments of the present disclosure, and for those of ordinary skill in the art, other drawings can also be obtained from these drawings without creative efforts.

DETAILED DESCRIPTION

Figure 1:
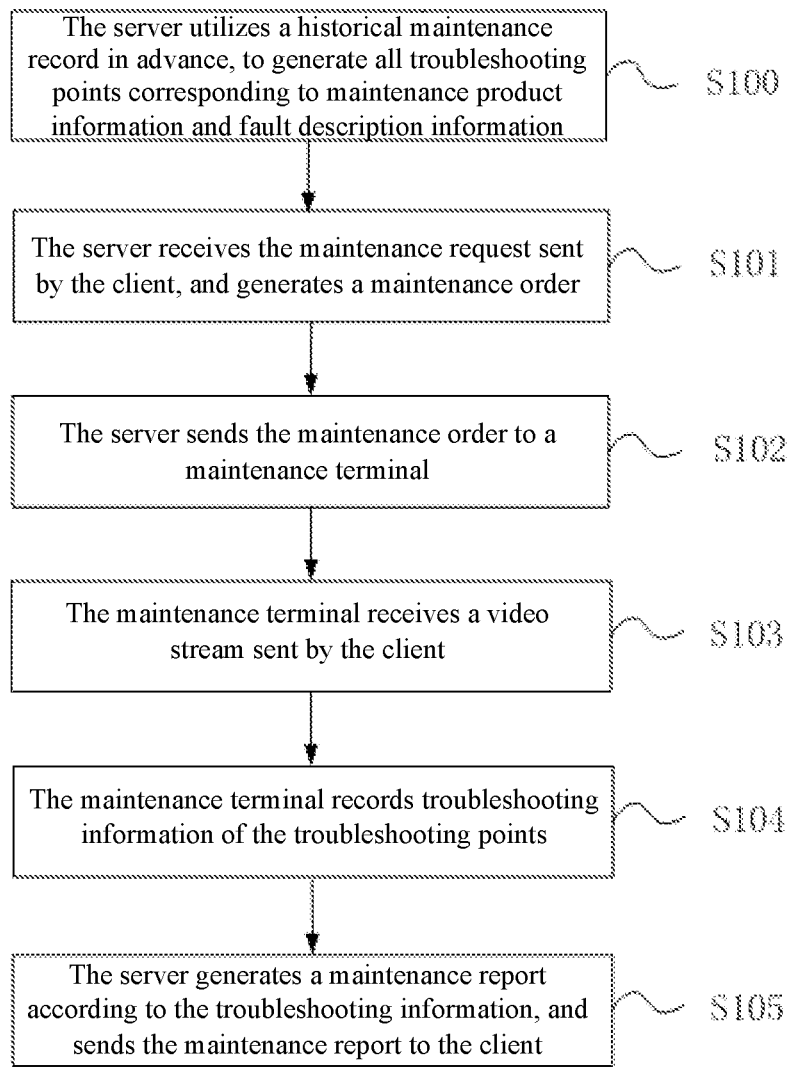
FIG. 1 shows a flowchart of a video-based maintenance method according to an embodiment of the present disclosure.

Example implementations will now be described more fully with reference to the drawings. The example implementations, however, can be embodied in various forms and should not be construed as limited to the examples set forth herein. Instead, these embodiments are provided so that the present disclosure will be thorough and complete, and will fully convey the concepts of the example embodiments to those skilled in the art. The described features, structures, or characteristics may be combined in any suitable manner in one or more embodiments.

Furthermore, the drawings are merely schematic illustrations of the present disclosure and are not necessarily drawn to scale. The same reference numerals in the drawings denote the same or similar parts, and thus their repeated descriptions will be omitted. Some of the block diagrams shown in the drawings are functional entities that do not necessarily correspond to physically or logically separate entities. These functional entities may be implemented in software, or in one or more hardware modules or integrated circuits, or in different networks and/or processor devices and/or microcontroller devices.

Figure 2:
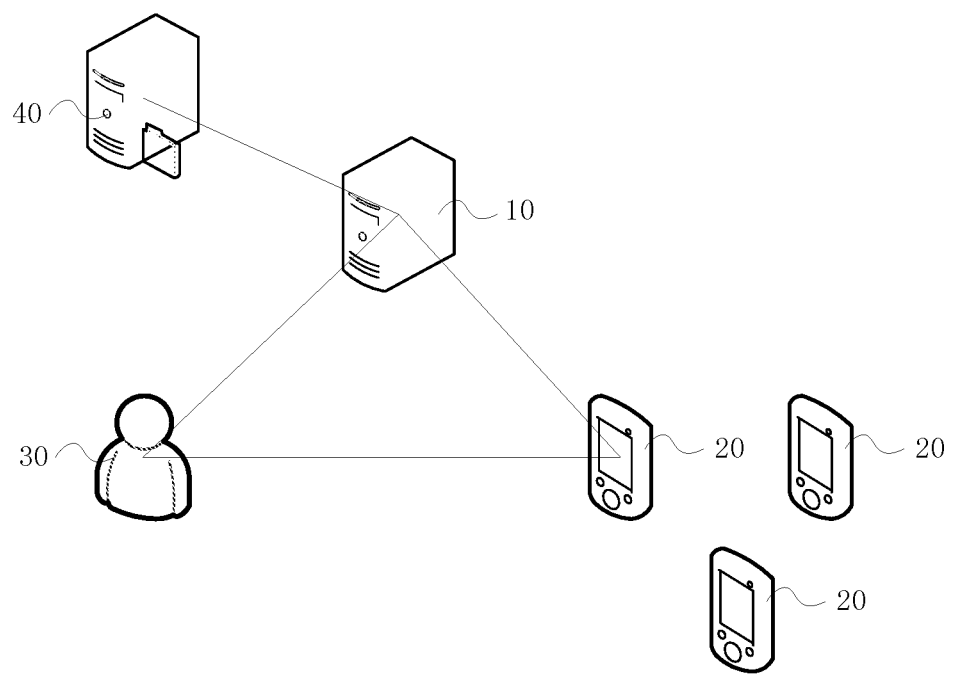
FIG. 2 shows a schematic structural diagram of a video-based maintenance system according to an embodiment of the present disclosure.

FIG. 1 is a flowchart of a video-based maintenance method provided by an exemplary embodiment of the present disclosure. FIG. 2 is a schematic structural diagram of a video-based maintenance system according to an embodiment of the present disclosure. As shown in FIGS. 1 and 2, the present disclosure provides a video-based maintenance system, which includes a server 10 and a plurality of maintenance terminals 20. The server 10 may be a software application installed in one physical device or installed in a plurality of physical devices in a distributed manner, and may also be an entity device that implements the function of the server in the present disclosure. The maintenance terminal 20 may be a software application installed in a mobile terminal or a personal computer, or may be an entity device that implements the function of the maintenance terminal 20 in the present disclosure.

The embodiment of the video-based maintenance method of the present disclosure will be specifically described below in conjunction with above-mentioned video-based maintenance system.

In step S100, the server 10 utilizes a historical maintenance record in advance to perform operations, to generate all of one or more troubleshooting points corresponding to faulty product information and fault description information. Specifically, in the embodiment, the historical maintenance record is normalized in advance according to dimensions of the faulty product information and the fault description information, to generate one or more troubleshooting points corresponding to specific faulty product information and fault description information, and to generate historical troubleshooting information corresponding to the troubleshooting points at the same time. Above information is stored as historical reference data. In other embodiments, some other methods can also be used to obtain the troubleshooting points corresponding to specific faulty product information and fault description information, and the historical troubleshooting information corresponding to the troubleshooting points, for example, by utilizing the historical maintenance record, and through machine learning or through machine optimization after a default setting.

In some embodiments, a video clip of a component, an image of a component, and a factory parameter of the product are also stored as the faulty product information.

After a client 30 sends a maintenance request, a step S101 is executed, in which the server 10 receives the maintenance request sent by the client 30, and generates a maintenance order according to the maintenance request.

Figure 7:
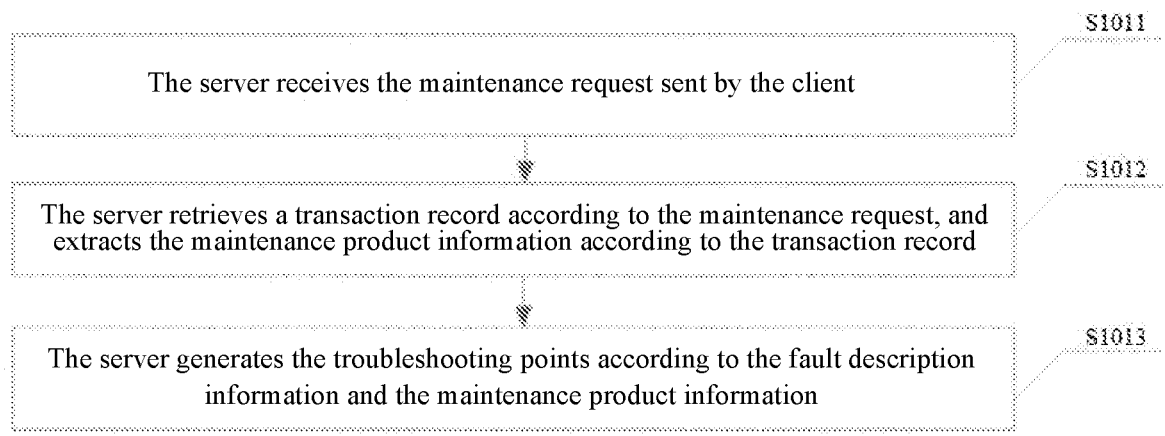
FIG. 7 shows a flowchart of another video-based maintenance method according to an embodiment of the present disclosure.

FIG. 7 shows a flowchart of another video-based maintenance method according to an embodiment of the present disclosure.

The video-based maintenance method shown in FIG. 7 further provides an embodiment of above step S101.

As shown in FIG. 7, specifically in the embodiment of the present disclosure, the step S101 further includes a step S1011, in which the server 10 receives the maintenance request sent by the client 30. The server 10 extracts from the maintenance request customer information, maintenance time and fault description information. The customer information includes, for example, a customer ID, a customer name, contact information, etc. The maintenance time refers to the time at which the customer wishes to perform a video-based maintenance. The fault description information includes a product name and a brief description of a product fault. In some embodiments, according to different product categories, various fault description information is preset, and is displayed in an interface of the client 30 for the customer to choose, so as to facilitate the consistency of data processing in the later stage, which also improves the user experience.

In some embodiments, after the server 10 receives above maintenance request, a step S1012 is executed, in which the server 10 retrieves a transaction record according to the maintenance request, and extracts the faulty product information according to the transaction record. In the embodiments of the present disclosure, the server 10 is connected to a customer transaction database 40. The server 10 retrieves the customer's transaction record in the customer transaction database 40 according to the customer information and the product name in the maintenance request, and extracts the faulty product information from the transaction record. The faulty product information includes specific content of the maintenance product such as a product model and a production batch. In other embodiments, the step S1012 may not be included, but above-mentioned faulty product information is provided by the client in the maintenance request, for example.

Next, the server 10 executes a step S1013, in which the server 10 generates the troubleshooting points according to the fault description information and the faulty product information.

After obtaining current fault description information and faulty product information, the server 10 matches the current fault description information and faulty product information with the historical reference data obtained in step S100, to obtain one or more corresponding troubleshooting points. The server 10 generates the maintenance order, and the maintenance order includes the customer information, the faulty product information, fault information, and the maintenance time. The fault information includes one or more troubleshooting points obtained in above steps. In some embodiments, the fault information further includes the historical troubleshooting information corresponding to the troubleshooting points, so as to display the historical troubleshooting information on the maintenance terminal 20 in subsequent steps, thereby further effectively assisting the repair man in fault determination and improving the accuracy of the fault determination. One may easily conceive that the maintenance time may not be provided in other embodiments, since the maintenance time is predetermined communication time between the client 30 and the maintenance terminal 20, which is not necessary.

Continuing to refer to FIGS. 1 and 2, in step S102, the server 10 sends the maintenance order to a maintenance terminal 20. In the embodiments of the present disclosure, the server 10 allocates a maintenance terminal 20 from the plurality of maintenance terminals 20, and sends the maintenance order to the maintenance terminal 20 allocated. According to an allocation algorithm, a total weighted value may be for example calculated based on a leisure degree and a geographical location of the maintenance terminal 20, and the largest value is used for allocation. Alternatively, the server 20 first allocates, according to a geographical area of the client 30, a corresponding allocation server that is divided based on the geographical area, and the allocation server then allocates the maintenance terminal 20.

The maintenance terminal 20 receives the maintenance order and displays the user information, the faulty product information, the fault information and the maintenance time. In step S103, a repair man using the maintenance terminal 20 connects to the client 30 through a wireless communication network according to the maintenance time, and receives a video stream sent by the corresponding client 30.

Figure 3:
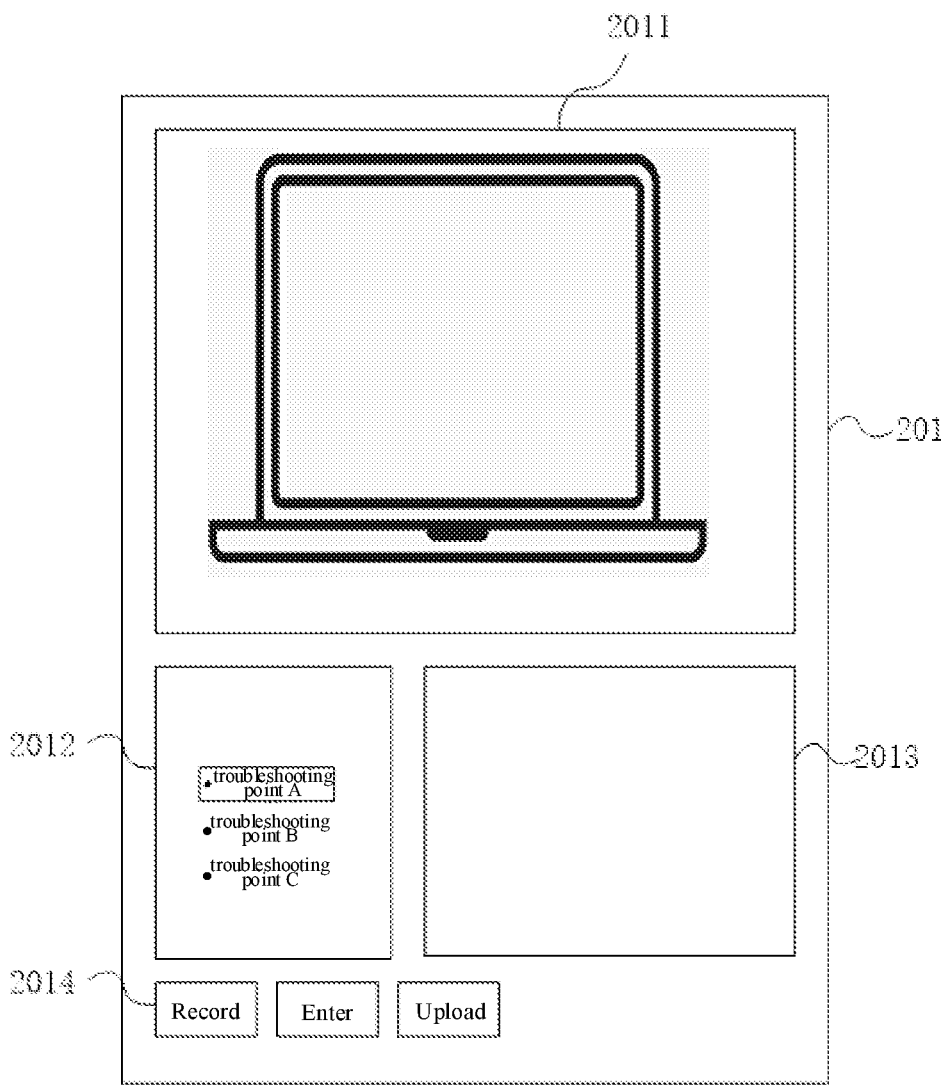
FIG. 3 shows a schematic diagram of an interface of a maintenance terminal for video-based maintenance according to an embodiment of the present disclosure.

FIG. 3 shows a schematic diagram of an interface of a maintenance terminal for video-based maintenance when receiving a video stream according to an embodiment of the present disclosure. As shown in FIG. 3, when receiving the video stream, the interface 201 of the maintenance terminal 20 displays a video stream area 2011, a troubleshooting point area 2012, and a troubleshooting information area 2013 for the current troubleshooting point. The video stream area 2011 is used to display the video stream sent by the client 30. The troubleshooting point area 2012 is used to display all troubleshooting points, wherein a troubleshooting point that is being examined currently is displayed in such a manner that it is distinguished from other troubleshooting points. The troubleshooting information area 2013 is used to display and record the troubleshooting information of the current troubleshooting point.

After the maintenance terminal 20 and the client 30 are communicatively connected, the repair man starts troubleshooting according to the current troubleshooting point displayed in the troubleshooting point area 2012. The customer takes a video related to the troubleshooting point according to instructions from the repair man, and the video is transmitted to the maintenance terminal 20 in real time in video streaming. In some embodiments, the maintenance terminal 20 and the client 30 are connected in a two-way video streaming communication, so as to facilitate the repair man to guide the customer, and to further improve the efficiency of the maintenance.

In step S104, the maintenance terminal records the troubleshooting information of the troubleshooting points. Specifically, the repair man determines the troubleshooting information of the current troubleshooting point according to the content displayed in the video stream, and records the troubleshooting information in the troubleshooting information area 2013. In some embodiments, the troubleshooting information area 2013 displays the historical troubleshooting information corresponding to the current troubleshooting point for reference and modification by the repair man, so as to further assist the repair man in troubleshooting, and improve the efficiency of the fault determination.

Figure 8:
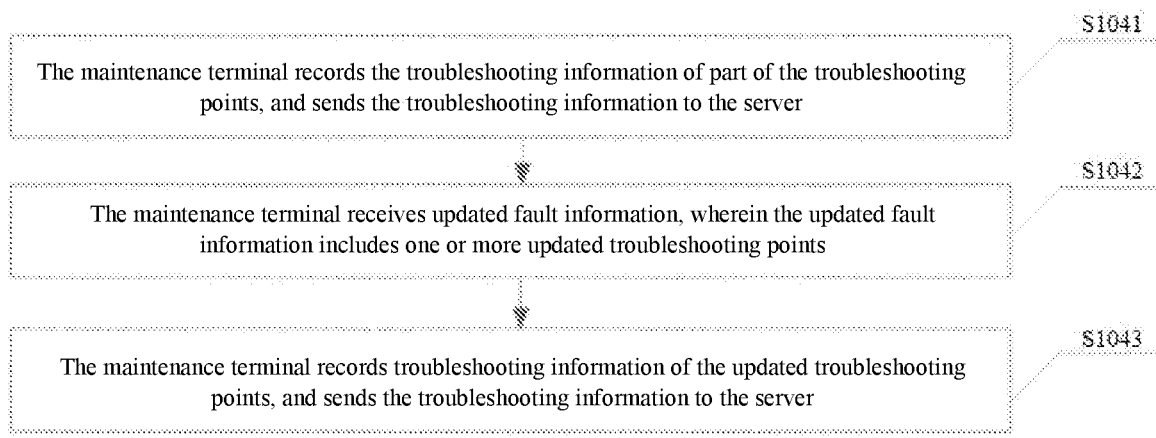
FIG. 8 shows a flowchart of another video-based maintenance method according to an embodiment of the present disclosure.

FIG. 8 shows a flowchart of another video-based maintenance method according to an embodiment of the present disclosure.

The video-based maintenance method shown in FIG. 8 further provides an embodiment of above step S104.

As shown in FIG. 8, in some embodiments, the step S104 further includes a step S1041, in which the maintenance terminal 20 records the troubleshooting information of part of the troubleshooting points, and sends the troubleshooting information to the server 10.

In some embodiments, the troubleshooting information mentioned above further includes a video clip or an image of a component. The maintenance terminal 20 extracts from the video stream the video clip or the image of a component corresponding to the troubleshooting points, which is used as the troubleshooting information of the troubleshooting points, and sends it to the server 10.

In the embodiments of the present disclosure, the interface 201 further includes a record button 2014. When the maintenance terminal 20 is receiving the video stream, the repair man issues an instruction to extract the video clip or the image of a component corresponding to the troubleshooting points by operating the record button 2014. The maintenance terminal 20 collects, in response to the instruction, the video clip or the image of a component, which is used as the troubleshooting information of the current troubleshooting point. In other embodiments, the maintenance terminal 20 may also automatically collect the video clip or the image of the current troubleshooting point.

In some embodiments, the server 10 generates updated fault information according to the troubleshooting information and sends the updated fault information to the maintenance terminal 20. The updated fault information includes one or more updated troubleshooting points and updated historical troubleshooting information.

Specifically, the server 10 compares the troubleshooting information received with the faulty product information or the historical troubleshooting information, so as to further refine, reduce or correct the fault information including the troubleshooting points.

In some embodiments, when the troubleshooting information sent by the maintenance terminal 20 includes the video clip or the image of a component, the server 10 generates fault determination information according to the video clip or the image of a component, and sends the fault determination information back to the maintenance terminal 20.

In the embodiments of the present disclosure, the server 10 utilizes computer vision technology to identify the video clip or the image of a component, extracts feature points, and calculates the feature point similarity with a video clip or an image of a component in the stored faulty product information, to generate the fault determination information. In other embodiments, a fault determination may also be performed by means of machine learning or the like. The server 10 performs the fault determination according to the video clip or the image of a component, so as to further assist the repair man in the fault determination, reduce errors in manual determination, and improve the efficiency of the fault determination.

Among which, computer vision (CV) technology refers to the application of cameras and computers instead of human eyes, to identify, track and measure targets or to perform other machine visions. The image is further processed by a computer, so that the image is more suitable for human eyes to observe or for transmission to an instrument for detection. The computer vision, as a scientific discipline, studies related theories and technologies, and tries to build an artificial intelligence system capable of obtaining information from an image or multidimensional data. Computer vision technology usually includes image processing, image recognition, image semantic understanding, image retrieval, OCR (Optical Character Recognition), video processing, video semantic understanding, video content/behavior recognition, three-dimensional object reconstruction, 3D (3-Dimension) technology, virtual reality, augmented reality, synchronous positioning and map construction and other technologies, as well as common biometric identification technologies such as face recognition and fingerprint recognition.

In step S1042, the maintenance terminal 20 receives the updated fault information, wherein the updated fault information includes one or more updated troubleshooting points.

In step S1043, the maintenance terminal 20 records troubleshooting information of the updated troubleshooting points, and sends the troubleshooting information to the server 10.

Steps S1041 to S1043 can be executed cyclically. The server 10 updates the fault information according to the troubleshooting information and sends it to the maintenance terminal 20, which can narrow and provide a more precise troubleshooting scope, thereby effectively assisting the repair man to improve the efficiency of the troubleshooting until all of the troubleshooting points are checked. In other embodiments, a step of updating the fault information may not be included.

The maintenance terminal 20 extracts the video clip or the image of a component as the troubleshooting information, and the server 10 performs fault determination and sends updated fault information back to the maintenance terminal 20, thereby further assisting the repair man in the fault determination.

In this way, it is possible to ensure that no troubleshooting points are omitted, thereby further assisting the repair man in conducting comprehensive and reliable maintenance.

In step S105, the server 10 generates a maintenance report according to the received troubleshooting information of all troubleshooting points, and sends the maintenance report to the client 30. The server 10 stores above maintenance report as the historical maintenance record. In the embodiments of the present disclosure, the maintenance report lists the troubleshooting information of all troubleshooting points according to a cause of the fault, and provides repair suggestions, so that it is convenient for the customer to decide, according to the maintenance report, whether the on-site maintenance by the repair man is needed.

According to above video-based maintenance method and video-based maintenance system, the client 30, the server 10 and the maintenance terminal 20 communicate with each other, so that before the on-site maintenance, the maintenance terminal 20 records the troubleshooting information of troubleshooting points by means of receiving a video stream sent by the client, and the server 10 generates a maintenance report and sends it to the client, thereby effectively assisting the repair man to carry out prepositive off-site maintenance. In this way, the customer can choose, according to a maintenance report, whether the on-site maintenance services are needed. One or more troubleshooting points are generated by the server, which can effectively assist the repair man to make fault determination, avoid missing causes of the fault, and improve the accuracy of the fault determination.

It should be noted that steps in above method are only illustrated descriptions of the processes included in the method according to the exemplary embodiment of the present disclosure, and are not restrictive of the present disclosure. It should be understood that the processes shown in the drawings do not indicate or limit the chronological order of these processes. In addition, it is also readily understood that these processes may be performed synchronously or asynchronously, for example, in multiple modules.

Figure 4:
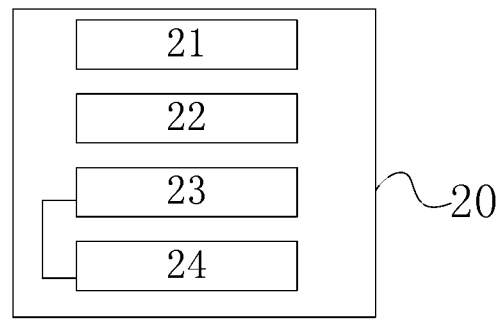
FIG. 4 shows a schematic block diagram of a maintenance terminal for video-based maintenance according to an embodiment of the present disclosure.

FIG. 4 shows a schematic block diagram of a maintenance terminal for video-based maintenance according to an embodiment of the present disclosure. The maintenance terminal 20 in an embodiment of the present disclosure will be described below with reference to FIG. 4.

The maintenance terminal 20 includes a maintenance order processing unit 21, a video communication unit 22 and a troubleshooting unit 23 for troubleshooting points. The maintenance order processing unit 21 is configured to receive a maintenance order sent by the server 10, and display customer information, faulty product information and fault information according to the maintenance order, wherein the fault information includes one or more troubleshooting points. The video communication unit 22 is configured to receive a video stream sent by the client 30 through the wireless communication network. In the embodiments, the video communication unit 22 can also send the video stream to the client 30, thereby improving the interactivity and improving the efficiency of the maintenance. The troubleshooting unit 23 is configured to receive and store troubleshooting information of the troubleshooting points, and send the troubleshooting information to the server 10. In the embodiments of the present disclosure, in response to input and modification of the troubleshooting information of the troubleshooting points from the repair man, the troubleshooting unit 23 stores the troubleshooting information and sends the troubleshooting information to the server 10. In the embodiments of the present disclosure, before the input and modification of the troubleshooting information of the troubleshooting points are received from the repair man, the historical troubleshooting information corresponding to the current troubleshooting point is obtained from the server 10 in advance, and displayed on the maintenance terminal 20, so as to further assist the repair man in troubleshooting to improve the accuracy and efficiency of maintenance.

In some embodiments, the maintenance terminal 20 further includes a troubleshooting information extraction unit 24, which is configured to extract from the video stream the video clip or the image of a component corresponding to the troubleshooting points, as the troubleshooting information of the troubleshooting points. In the embodiments of the present disclosure, the troubleshooting information extraction unit 24 responds to an operation on the maintenance terminal 20 from the repair man. For example, when the repair man clicks the record button 2014, the video clip or the image of a component is captured and stored, and the troubleshooting unit 23 sends the video clip or the image of a component to the server 10 as the troubleshooting information. The maintenance terminal 20 receives the fault determination information generated from the video clip or the image of a component returned by the server 10, thereby effectively assisting the repair man in troubleshooting, reducing subjective errors, and improving the accuracy of maintenance.

It is conceivable that in addition to the units described in above embodiments, the maintenance terminal 20 may also include other functional units according to actual functions and needs, such as a communication unit for wireless data communication, a display unit, a control unit, and the like.

The maintenance terminal 20 may be configured to implement the video-based maintenance method and system in above-mentioned embodiment. In this case, the arrangement of the maintenance terminal 20 may refer to above descriptions of the video-based maintenance method, which will not be repeated here.

The maintenance terminal 20 may be mobile phone, game console, tablet computer, e-book reader, smart glasses, MP4 (Moving Picture Experts Group Audio Layer IV) player, smart home equipment, AR (Augmented Reality) equipment, VR (Virtual Reality) equipment and other mobile terminals. Alternatively, the maintenance terminal 20 may also be personal computer (PC), such as a laptop computer and a desktop computer and so on. The units in the maintenance terminal 20 may be functional modules corresponding to respective application programs.

It can be seen from above descriptions that the maintenance terminal 20 for video-based maintenance provided by the present disclosure receives the video stream sent by the client 30 through the video communication unit 22, and cooperates with the maintenance order processing unit 21, which displays one or more troubleshooting points, so as to effectively assist the repair man to carry out prepositive off-site maintenance, avoid missing causes of the fault, and improve the accuracy of the fault determination. The troubleshooting unit 23 receives and stores the troubleshooting information of the troubleshooting points, and sends the troubleshooting information to the server 10, so that the server 10 can generate a maintenance report in subsequent operations, and send the maintenance report to the client, so as to realize the off-site maintenance, and to help the customer to decide, according to the maintenance report, whether the on-site maintenance is needed.

Figure 5:
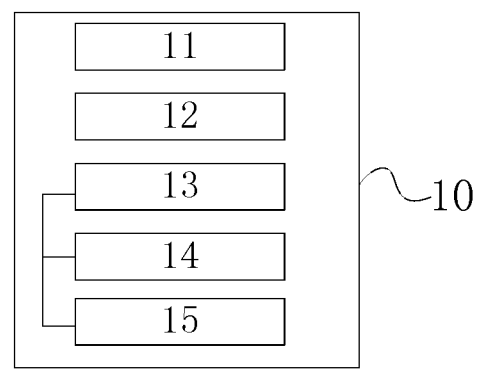
FIG. 5 shows a schematic block diagram of a server for video-based maintenance according to an embodiment of the present disclosure.

FIG. 5 shows a schematic block diagram of a server for video-based maintenance according to an embodiment of the present disclosure. The server 10 in an embodiment of the present disclosure will be described below with reference to FIG. 5.

The server 10 includes a maintenance order generation unit 11, a maintenance allocation unit 12, a maintenance recording unit 13 and a maintenance report generation unit 14. The maintenance order generation unit 11 is configured to receive a maintenance request sent by the client 30, and generate a maintenance order according to the maintenance request. The maintenance order includes customer information, faulty product information and fault information, wherein the fault information includes one or more troubleshooting points. Specifically, in the embodiments of the present disclosure, the maintenance order generation unit 11 extracts customer information and fault description information from the maintenance request. The customer information includes, for example, a customer ID, a customer name, contact information, etc. The fault description information includes a product name and a brief description of a product fault. The maintenance order generation unit 11 retrieves a transaction record according to the customer information and the product name in the maintenance request, and extracts the faulty product information from the transaction record. The faulty product information includes specific content of the maintenance product such as a product model and a production batch. It should be noted that in other embodiments, the above-mentioned faulty product information may also be provided by the client 30 when generating the maintenance request. The maintenance order generation unit 11 generates a maintenance order according to the fault description information and the faulty product information. For details for generating the troubleshooting points, references can be made to above descriptions of the video-based maintenance method.

The maintenance allocation unit 12 is configured to send the maintenance order to a maintenance terminal 20 of the plurality of maintenance terminals 20.

When the maintenance terminal 20 communicates with the client 30 and receives the video stream sent by the client 30, the maintenance terminal 20 records, according to the troubleshooting points, the troubleshooting information of the current troubleshooting point, and sends it to the server 10. In this case, the maintenance recording unit 13 of the server 10 receives the troubleshooting information of all troubleshooting points sent by the maintenance terminal 20.

The maintenance report generation unit 14 is configured to generate a maintenance report according to the troubleshooting information, and send the maintenance report to the client 30.

In some embodiments, the server 10 provided by the embodiment of the present disclosure further includes a fault determination unit 15. When receiving the video stream, the maintenance terminal 20 records the video clip or the image of a component corresponding to the current troubleshooting point, and sends above video clip or image of a component to the server 10 as the troubleshooting information of the current troubleshooting point. The fault determination unit 15 generates fault determination information according to the video clip or the image of a component, and sends the fault determination information back to the maintenance terminal 20, thereby assisting the maintenance terminal 20 to perform fault determination. A fault determination method implemented by the fault determination unit 15 refers to above descriptions of the video-based maintenance method.

It is conceivable that, in addition to the units described in above embodiments, the server 10 may also include other functional units according to actual functions and needs, such as a communication unit for wireless data communication, a display unit, a control unit, and the like.

The server 10 may be configured to implement the video-based maintenance method and system in above-mentioned embodiment. In this case, the arrangement of the server 10 may refer to the above descriptions of the video-based maintenance method, which will not be repeated here.

The server 10 may be a server, or may be composed of several servers, or a virtualization platform, or a cloud computing service center. The server 10 is used to provide background services for the application program that provides the video-based maintenance method.

It can be seen from above descriptions that the server 10 for video-based maintenance provided by the present disclosure generates a maintenance order including one or more troubleshooting points through the maintenance order generation unit 11, and sends the maintenance order to the maintenance terminal 20 through the maintenance allocation unit 12, thereby realizing the effective allocation of the maintenance terminals 20 and assisting the repair man in completing the prepositive off-site maintenance in subsequent operations, to avoid missing causes of the fault and improve the accuracy of the fault determination. The server 10 receives the troubleshooting information recorded by the maintenance terminal 20 in response to receiving the video stream sent by the client 30 through the maintenance recording unit 13, and generates the maintenance report through the maintenance report generation unit 14 and sends it to the client, thereby realizing off-site maintenance assistance.

In an exemplary embodiment of the present disclosure, a computer-readable storage medium is also provided, on which a program product capable of implementing above-mentioned video-based maintenance method of the present disclosure is stored. In some possible implementations, aspects of the present disclosure can also be implemented in the form of a program product including program codes, and when the program product is run on a terminal device, the program codes enable the terminal device to execute steps according to various exemplary embodiments of the present disclosure described in above "example method" in the specification.

Figure 6:
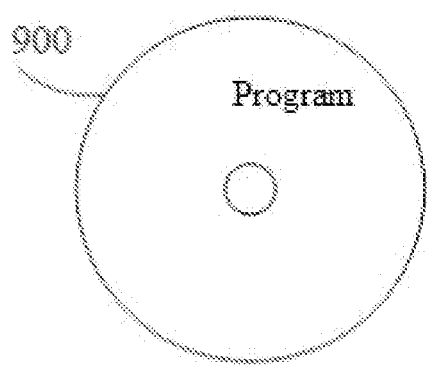
FIG. 6 shows a schematic diagram of a storage medium according to an embodiment of the present disclosure.

Referring to FIG. 6, a program product 900 for implementing above method according to the embodiments of the present disclosure is shown. The program product 900 can be a portable compact disk read only memory (CD-ROM) including program codes, and can be run on a terminal device, such as running on a personal computer. However, the program product of the present disclosure is not limited thereto. In the present disclosure, a readable storage medium may be any tangible medium that contains or stores a program, and the program can be used by or in conjunction with an instruction execution system, apparatus, or device.

The program product may be any combination of one or more readable media. The readable medium may be a readable signal medium or a readable storage medium. The readable storage medium may be, for example, but not limited to, an electrical, magnetic, optical, electromagnetic, infrared, or semiconductor system, apparatus or device, or a combination of any of the above. More specific examples (non-exhaustive list) of readable storage media include, electrical connections with one or more wires, portable disks, hard disks, random access memory (RAM), read only memory (ROM), erasable programmable read only memory (EPROM or flash), optical fiber, portable compact disk read only memory (CD-ROM), optical storage devices, magnetic storage devices, or any suitable combination of the above.

A computer readable signal medium may include a propagated data signal in a baseband or as part of a carrier wave with readable program codes embodied thereon. Such propagated data signals may take a variety of forms, including but not limited to electromagnetic signals, optical signals, or any suitable combination of the above. A readable signal medium may also be any readable medium other than a readable storage medium that can transmit, propagate, or transport the program used by or in connection with the instruction execution system, apparatus, or device.

Program codes embodied on a readable medium may be transmitted using any suitable medium, including but not limited to wireless, wireline, optical fiber cable, RF, etc., or any suitable combination of the above.

Program codes for carrying out operations of the present disclosure may be written in any combination of one or more programming languages, including object-oriented programming languages, such as Java, C++, etc., as well as conventional procedural programming languages, such as "C" language or similar programming languages. The program codes may be executed entirely on a user's computing device, partly on the user's device, as a stand-alone software package, partly on the user's computing device and partly on a remote computing device, or entirely on the remote computing device or a server. Where the remote computing device is involved, the remote computing device may be connected to the user's computing device over any kind of network, including a local area network (LAN) or a wide area network (WAN), or may be connected to an external computing device (e.g., connected via the Internet with the help of an Internet Service Provider).

It should be noted that although several modules or units of the apparatus for performing actions are mentioned in above detailed descriptions, such division is not mandatory. Indeed, according to the embodiments of the present disclosure, the features and functions of two or more modules or units described above may be embodied in one module or unit. Conversely, the features and functions of one module or unit described above may be further divided into multiple modules or units to be embodied.

Additionally, although various steps of the method of the present disclosure are depicted in the figures in a particular order, this does not require or imply that the steps must be executed in the particular order or that all illustrated steps must be executed to achieve the desired result. Additionally or alternatively, certain steps may be omitted, multiple steps may be combined into one step for execution, and/or one step may be decomposed into multiple steps for execution, and the like.

From descriptions of above embodiments, it can be easily understood for those skilled in the art that the exemplary embodiments described herein may be implemented by software, or by a combination of software and necessary hardware. Therefore, the technical solutions according to the embodiments of the present disclosure may be embodied in the form of software products. The software products may be stored in a non-volatile storage medium (which may be CD-ROM, U disk, mobile hard disk, etc.) or on the network, including several instructions to cause a computing device (which may be a personal computer, a server, a mobile terminal, or a network device, etc.) to implement the method according to the embodiments of the present disclosure.

Other embodiments of the present disclosure will be easily conceivable to those skilled in the art upon consideration of the specification and practice of the invention disclosed herein. The present disclosure is intended to cover any variations, uses, or adaptations of the present disclosure that follow the general principles of the present disclosure and include common knowledge or conventional technical means in the art which are not disclosed by the present disclosure. The specification and examples are to be regarded as examples only, and the true scope and spirit of the present disclosure are indicated by the appended claims.

What is claimed is:

1. A video-based maintenance method, wherein a maintenance terminal is communicatively connected to a server and a client, and the method comprises:
   receiving, by the maintenance terminal, a maintenance order sent by the server, wherein the maintenance order is generated according to a maintenance request sent by the client, the maintenance request comprises fault description information, and the maintenance order comprises customer information, faulty product information and fault information; and wherein the faulty product information comprises at least one of a product model, a production batch, a video clip of a component, an image of a component, and a factory parameter of the product, and the fault information comprises one or more troubleshooting points; and wherein the one or more troubleshooting points are obtained by the server by matching the fault description information and the faulty product information with historical reference data after obtaining the fault description information and the faulty product information;
   receiving, by the maintenance terminal, a video stream sent by the client; and
   recording, by the maintenance terminal, troubleshooting information of the troubleshooting points, and sending the troubleshooting information to the server.

2. The video-based maintenance method according to claim 1, wherein recording, by the maintenance terminal, troubleshooting information of the troubleshooting points, and sending the troubleshooting information to the server comprises:
   recording, by the maintenance terminal, troubleshooting information of part of the troubleshooting points, and sending the troubleshooting information to the server;
   receiving, by the maintenance terminal, updated fault information, wherein the updated fault information comprises one or more updated troubleshooting points, and the updated fault information is generated and updated by the server according to the troubleshooting information; and
   recording, by the maintenance terminal, troubleshooting information of the updated troubleshooting points, and sending the troubleshooting information to the server.

3. The video-based maintenance method according to claim 1, wherein recording, by the maintenance terminal, troubleshooting information of the troubleshooting points, and sending the troubleshooting information to the server comprises:
   extracting, by the maintenance terminal, from the video stream a video clip or an image of a component corresponding to the troubleshooting points, and sending the video clip or the image to the server as the troubleshooting information of the troubleshooting points.

4. The video-based maintenance method according to claim 3, wherein recording, by the maintenance terminal, troubleshooting information of the troubleshooting points, and sending the troubleshooting information to the server comprises:
   receiving and displaying, by the maintenance terminal, fault determination information generated by the server according to the video clip or the image of a component.

5. A video-based maintenance method, comprising:
   utilizing, by a server, a historical maintenance record in advance to perform operations, to generate one or more troubleshooting points corresponding to faulty product information and fault description information, as historical reference data;
   receiving, by the server, a maintenance request sent by a client, and generating a maintenance order according to the maintenance request, wherein the maintenance request comprises the fault description information, and the maintenance order comprises customer information, faulty product information and fault information; and wherein the faulty product information comprises at least one of a product model, a production batch, a video clip of a component, an image of a component, and a factory parameter of the product, and the fault information comprises one or more troubleshooting points; and wherein the one or more troubleshooting points are obtained by the server by matching the fault description information and the faulty product information with the historical reference data after obtaining the fault description information and the faulty product information;
   sending, by the server, the maintenance order to a maintenance terminal;
   receiving, by the server, troubleshooting information sent by the maintenance terminal, wherein the troubleshooting information is recorded by the maintenance terminal in response to receiving a video stream sent by the client; and
   generating, by the server, a maintenance report according to the troubleshooting information, and sending the maintenance report to the client.

6. The video-based maintenance method according to claim 5, wherein receiving, by a server, a maintenance request sent by a client, and generating a maintenance order according to the maintenance request:
   receiving, by the server, the maintenance request sent by the client;
   retrieving, by the server, a transaction record according to the maintenance request, and extracting the faulty product information from the transaction record; and
   generating, by the server, the troubleshooting points according to the fault description information and the faulty product information.

7. A video interactive maintenance system, comprising:
   a server and a plurality of maintenance terminals; wherein the server is configured to utilize a historical maintenance record in advance to perform operations, to generate one or more troubleshooting points corresponding to faulty product information and fault description information, as historical reference data;
   the server is configured to receive a maintenance request sent by a client, and generate a maintenance order according to the maintenance request, wherein the maintenance request comprises the fault description information, and the maintenance order comprises customer information, faulty product information and fault information; and wherein the faulty product information comprises at least one of a product model, a production batch, a video clip of a component, an image of a component, and a factory parameter of the product, and the fault information comprises one or more troubleshooting points; and wherein the one or more troubleshooting points are obtained by the server by matching the fault description information and the faulty product information with the historical reference data after obtaining the fault description information and the faulty product information;

the server is configured to send the maintenance order to a maintenance terminal of the plurality of maintenance terminals;

the maintenance terminal is configured to receive a video stream sent by the client;

the maintenance terminal is configured to record troubleshooting information of the troubleshooting points, and send the troubleshooting information to the server; and the server is configured to generate a maintenance report according to the troubleshooting information, and send the maintenance report to the client.

8. A non-transitory computer-readable storage medium having a computer program stored thereon, which when executed by a processor, cause the video-based maintenance method according to claim 1 to be implemented.

9. The video interactive maintenance system according to claim 7, wherein the maintenance terminal is further configured to:

record troubleshooting information of part of the troubleshooting points, and send the troubleshooting information to the server;

receive updated fault information, wherein the updated fault information comprises one or more updated troubleshooting points, and the updated fault information is generated and updated by the server according to the troubleshooting information; and record troubleshooting information of the updated troubleshooting points, and send the troubleshooting information to the server.

10. The video interactive maintenance system according to claim 7, wherein the maintenance terminal is further configured to:

extract from the video stream a video clip or an image of a component corresponding to the troubleshooting points, and send the video clip or the image to the server as the troubleshooting information of the troubleshooting points.

11. The video interactive maintenance system according to claim 10, wherein the maintenance terminal is further configured to:

receive and display fault determination information generated by the server according to the video clip or the image of a component.

12. The video interactive maintenance system according to claim 7, wherein the server is further configured to:

retrieve a transaction record according to the maintenance request, and extract the faulty product information from the transaction record; and generate the troubleshooting points according to the fault description information and the faulty product information.

\* \* \* \* \*